US008625861B2

(12) United States Patent
Aggarwal et al.

(10) Patent No.: US 8,625,861 B2
(45) Date of Patent: Jan. 7, 2014

(54) FINGERPRINT REPRESENTATION USING GRADIENT HISTOGRAMS

(75) Inventors: Gaurav Aggarwal, Greenbelt, MD (US);
Rudolf Maarten Bolle, Bedford Hills, NY (US); Tsai-Yang Jea, Poughkeepsie, NY (US); Nalini Kanta Ratha, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 12/120,936

(22) Filed: May 15, 2008

(65) Prior Publication Data
US 2009/0285459 A1  Nov. 19, 2009

(51) Int. Cl.
*G06K 9/00* (2006.01)
(52) U.S. Cl.
USPC ............................ 382/125; 382/115; 382/168
(58) Field of Classification Search
USPC ............................................. 382/115, 125, 124
See application file for complete search history.

(56) References Cited

U.S. PATENT DOCUMENTS

| 5,187,747 | A | * | 2/1993 | Capello et al. | 382/124 |
| 5,610,993 | A | * | 3/1997 | Yamamoto | 382/124 |
| 6,201,886 | B1 | | 3/2001 | Nakayama | |
| 7,110,581 | B2 | * | 9/2006 | Xia et al. | 382/124 |
| 7,539,331 | B2 | * | 5/2009 | Wendt et al. | 382/124 |
| 7,565,548 | B2 | * | 7/2009 | Fiske et al. | 713/186 |
| 7,876,933 | B2 | * | 1/2011 | Jang et al. | 382/124 |
| 2002/0146178 | A1 | * | 10/2002 | Bolle et al. | 382/254 |
| 2006/0023921 | A1 | * | 2/2006 | Saitoh et al. | 382/115 |
| 2007/0297653 | A1 | | 12/2007 | Bolle et al. | |
| 2008/0080750 | A1 | | 4/2008 | Bee et al. | |
| 2009/0310830 | A1 | * | 12/2009 | Bolle et al. | 382/124 |

FOREIGN PATENT DOCUMENTS

| WO | 2007/080133 | 7/2007 |
| WO | 2007080133 | 7/2007 |

OTHER PUBLICATIONS

A.M. Bazen et al., "A Correlation-Based Fingerprint Verification System," in Proceedings of the ProRISC Workshop on Circuits, Systems and Signal Processing, Nov. 2000, pp. 1-8, Netherlands.
A.K. Jain et al., "Filterbank-Based Fingerprint Matching," IEEE Transactions on Image Processing, May 2000, pp. 846-859, vol. 9, No. 5.
A. Ross et al., "A Hybrid Fingerprint Matcher," Pattern Recognition, Jul. 2003, pp. 1661-1673, vol. 36, No. 7.
K. Nandakumar et al., "Local Correlation-Based Fingerprint Matching," in Proceedings of Indian Conference on Computer Vision, Graphics and Image Processing (ICVGIP), Dec. 2004, pp. 1-6, Kolbata.

(Continued)

*Primary Examiner* — Amir Alavi
*Assistant Examiner* — Kenny Cese
(74) *Attorney, Agent, or Firm* — Preston J. Young; Ryan, Mason & Lewis, LLP (57) ABSTRACT

Techniques for generating a gradient characterization for a first fingerprint image are provided. One or more fingerprint feature points are selected from the first fingerprint image. A region is obtained for each of the one or more selected fingerprint feature points. The region is a representation of an area proximate a given fingerprint feature point. Each of the obtained regions is divided into a plurality of sub-regions. A histogram is generated for each of the plurality of sub-regions. For each of the one or more selected fingerprint feature points, the one or more generated histograms are combined into a concatenated histogram. The concatenated histogram is used for identification purposes.

20 Claims, 5 Drawing Sheets

(56) References Cited

OTHER PUBLICATIONS

N. Dalal et al., "Histograms of Oriented Gradients for Human Detection," in Proceedings of IEEE International Conference on Computer Vision and Pattern Recognition, 2005, 8 pages.

D. Maio et al., "Fvc2002: Second Fingerprint Verification Competition," in Proceedings of the 16th International Conference on Pattern Recognition (3), 2002, 4 pages.

International Search Report for PCT/US09/40347 dated Jun. 12, 2009.

* cited by examiner

FIG. 4

FINGERPRINT REPRESENTATION USING GRADIENT HISTOGRAMS

FIELD OF THE INVENTION

The present invention generally relates to fingerprint image processing systems and, more particularly, to techniques for generating a gradient characterization for a fingerprint image which may be used for identification purposes in such fingerprint image processing systems.

BACKGROUND OF THE INVENTION

Fingerprint based biometric matching continues to be a leading topic of research in the field of image analysis. Tremendous amounts of money and resources have been spent on analyzing fingerprints to match them accurately, robustly, and efficiently. Although great leaps and bounds have been achieved in fingerprint matching technology, there is still room for improvement. Currently, the performance of biometric matching is at an all time high, but operational demands continue to grow. As biometric databases increase in size, there is an equally growing demand for more processing power. One key goal is to increase processing speed without compromising matching efficiency. Conventional techniques address the issue of speed by purchasing faster computers. However, this solution fails to address the issue of efficiency. Efficiency can only be addressed by changing the way in which biometric data is processed.

Current state-of-the-art fingerprint matchers are quite fast and robust as far as 1:1 verification is concerned, but these conventional systems are less efficient at comparing a query sequentially against a large set of gallery fingerprints for identification tasks. In an effort to maximize efficiency, indexing schemes have been proposed. Generally, the theory behind an indexing scheme is to create an index gallery of biometrics using suitable features so that sequential matching is not required for identification. Ideally, after a biometric image is indexed, it does not require any additional post-processing step prior to matching.

Indexing schemes rely on particular characteristics of a biometric image and those characteristics are then used to index the biometric. For example, most existing approaches use minutiae graphs to characterize fingerprint images. Under this technique, the geometry of a minutiae graph of one fingerprint is compared to the geometry of other minutiae graphs stored in a biometric database. Although this technique is faster than comparing two biometric images pixel by pixel, this technique is still time-consuming and results in matching errors. In addition to the large number of required geometric calculations, the computed geometric values are prone to error if the minutiae points are slightly unclear.

SUMMARY OF THE INVENTION

Principles of the present invention provide techniques that overcome the above-mentioned drawbacks associated with existing methods by providing techniques that address the above needs, as well as other needs. More particularly, principles of the invention provide techniques for generating a gradient characterization for a fingerprint image. The gradient characterization may then be used for identification purposes. This technique of indexing fingerprint biometrics is more efficient because it does not utilize geometric information and is less prone to matching errors.

For example, in one embodiment of the invention, a technique for generating a gradient characterization for a first fingerprint image comprises the following steps. One or more fingerprint feature points are selected from the first fingerprint image. A region is obtained for each of the one or more selected fingerprint feature points. The region being a representation of an area proximate a given fingerprint feature point. Each of the obtained regions is divided into a plurality of sub-regions. A histogram is generated for each of the plurality of sub-regions. The one or more generated histograms are combined into a concatenated histogram for each of the one or more selected fingerprint feature points. The concatenated histogram is then used for identification purposes. In one embodiment, the histogram may be a histogram of oriented gradient.

The above technique may further comprise the step of enhancing the first fingerprint image before selecting the one or more fingerprint feature points. Further, each obtained region may be rotated into a comparable direction.

In an additional embodiment, a first histogram set comprising the concatenated histograms of the first fingerprint image may be generated. Also, one or more second histogram sets using one or more second fingerprint images may be generated. The first histogram set may be compared to the one or more second histogram sets. In an alternate embodiment, the step of comparing may further comprise the step of computing a degree of correlation between the first histogram set and the one or more second histogram sets. The degree of correlation may be based on a number of correspondences between the first histogram set and the one or more second histogram sets.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described in conjunction with exemplary methods for generating a gradient characterization for a fingerprint. It should be understood, however, that the invention is not limited to the particular embodiments described herein. The principles of this invention are generally applicable to the generation of any suitable biometric characterization which may be used for identification purposes, and modifications to the illustrative embodiments will become apparent to those skilled in the art given the teachings described herein.

The term "gradient characterization" as used herein is intended to be construed broadly so as to encompass, by way of example and without limitation, any gradient-based representation of an image.

The term "histogram" as used herein is intended to be construed broadly so as to encompass, by way of example and without limitation, any graph of tabulated frequencies. A "gradient histogram" as described in conjunction with the present invention refers to a graph of tabulated light gradients for a particular image.

Figure 1:
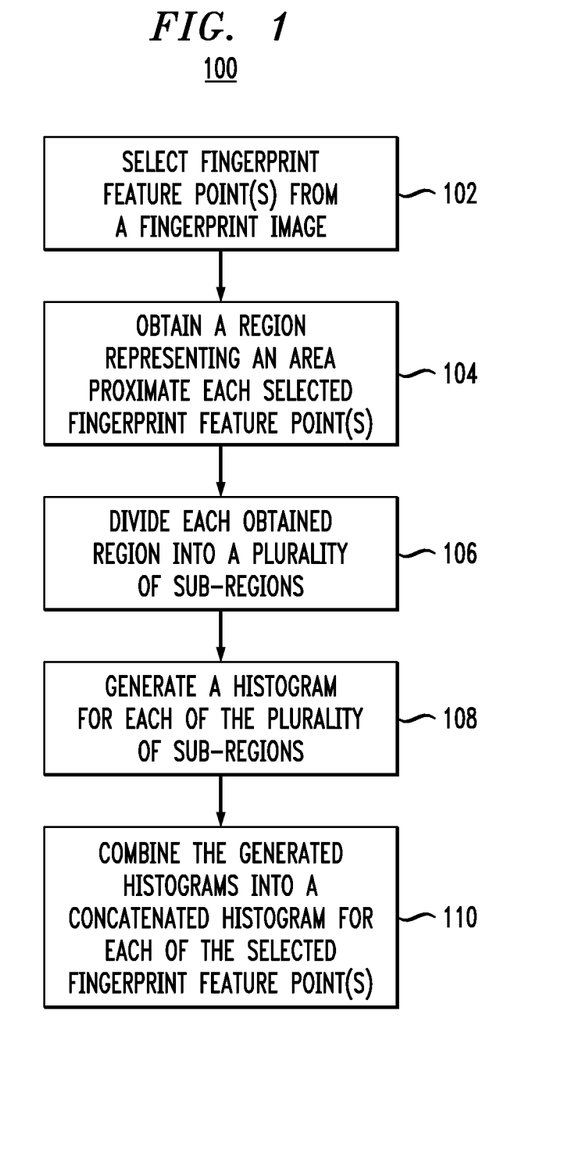
FIG. 1 is a flow diagram illustrating a methodology for generating a gradient characterization for a fingerprint image, according to an embodiment of the present invention.

Existing biometric approaches utilize the geometry of minutiae graphs to characterize fingerprints. We propose a gradient-based approach that utilizes the textural features of a biometric image. Referring initially to FIG. 1, a flow diagram illustrates a methodology 100 for generating a gradient characterization for a fingerprint image, according to an embodiment of the present invention. In an illustrative embodiment, methodology 100 is performed by a computer-based image processing unit which is coupled to a biometric database and/or a biometric scanner. A biometric image (e.g., a fingerprint image) is first scanned or retrieved from a biometric database for analysis. At step 102, fingerprint feature points are selected from the fingerprint image. The selection of feature points involves identifying the minutiae points of a fingerprint. Fingerprint minutiae contain ridge endings and/or bifurcations which are unique to an individual. Techniques for locating minutiae are well known to a person having ordinary skill in the art.

After selecting fingerprint feature points, a region representing an area proximate (i.e., near) each selected feature point is obtained (step 104). These regions may be referred to as patches. At step 106, each region, or patch, is divided into a plurality of sub-regions. An illustrative embodiment of a division in to sub-regions will be described in greater detail with reference to FIG. 2.

At step 108, a histogram is generated for each sub-region of a given patch. In an illustrative embodiment, the histogram is a Histogram of Oriented Gradient (HOG). HOG representations are a class of feature descriptors often used for the task of object detection. N. Dalal et al., "Histograms of oriented gradients for human detection," in *Proceedings of IEEE International Conference on Computer Vision and Pattern Recognition*, 2005, pp. 886-893, the disclosure of which is incorporated by reference herein. HOG-based object detectors rely on the hypothesis that local object appearance may be characterized using the distribution of local gradients, even without precise knowledge of the gradient positions.

In an exemplary embodiment, we use HOG-based descriptors to characterize fingerprint textures. HOGs are conventionally computed using a dense grid of overlapping blocks. However, computing HOG descriptors on a dense grid of overlapping blocks may neither be efficient nor robust for the task of fingerprint matching. Therefore, unlike most HOG-based approaches for object/person detection, we compute HOG descriptors for local regions around minutiae locations (e.g., histograms of the sub-regions of a given patch). This approach satisfies our goal to generate efficient, discriminable, and robust descriptions of the ridge flow patterns of a fingerprint. For instance, computing histograms for small sub-regions around minutiae locations provide robustness as compared to any point-wise descriptor. Further, since the HOG descriptors are computed for small unique regions, it ensures that the discriminable information of the minutiae are not lost. Finally, the HOGs are unaffected by translations and rotations and the gradients can be normalized with respect to minutiae orientation. Therefore, the textural characterizations of the minutiae are independent of their absolute location on a fingerprint and there is no need to uniformly align fingerprints images in a consistent and precise manner prior to matching.

At step 110, the generated histograms derived from each fingerprint feature point are combined into a concatenated histogram. For example, if fifty feature points are selected from a fingerprint image and each patch associated with each fingerprint feature point is divided into five sub-regions, there will be fifty concatenated histograms each containing the gradient information of five sub-histograms. In an illustrative embodiment, the fifty concatenated histograms derived from a given fingerprint image are stored together as one histogram set.

It should be noted that the steps of methodology 100 may be repeated for multiple fingerprint images, yielding multiple histogram sets. One histogram set represents one fingerprint image (e.g., fingerprint representation). The fingerprint representation may be used in fingerprint recognition systems. In an exemplary matching process, one fingerprint representation, in the form of a histogram set, is compared to a database of stored fingerprint representations for identification purposes.

The steps of methodology 100 will be illustrated below in greater detail with reference to FIG. 3. Furthermore, the comparison (e.g., matching) of concatenated histograms will be described in greater detail with reference to FIG. 4.

Figure 2:
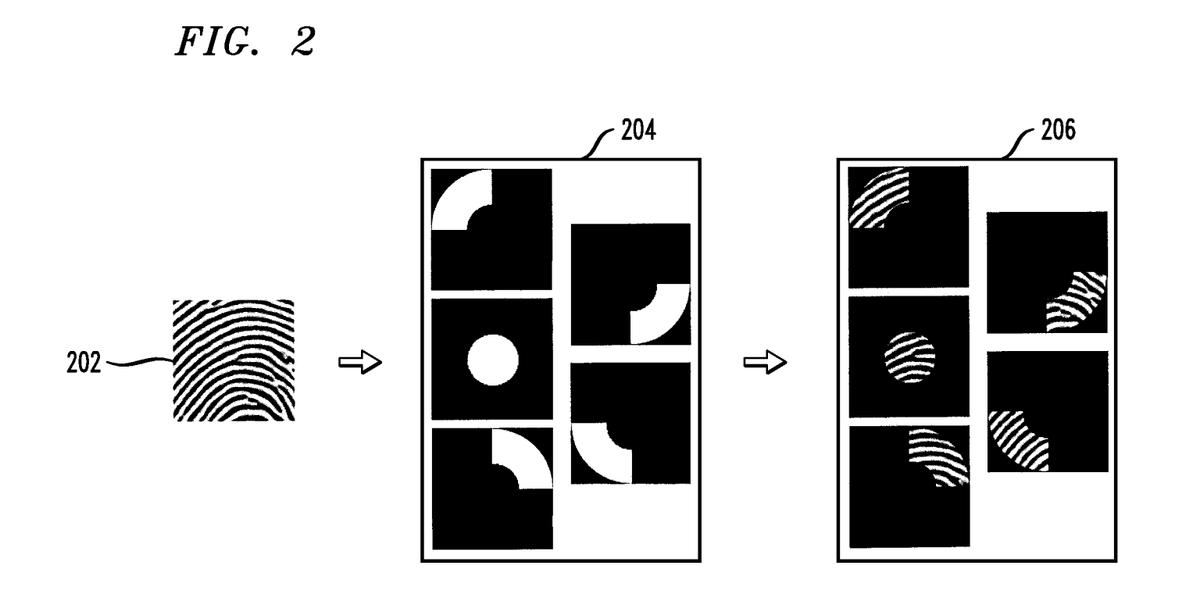
FIG. 2 is a diagram illustrating the local regions around a fingerprint minutiae which are used to generate gradient characterizations, according to an embodiment of the present invention.

Referring now to FIG. 2, a diagram illustrates the local regions around a fingerprint minutiae which are used to generate gradient characterizations, according to an embodiment of the present invention. In this exemplary embodiment, fingerprint region 202 is divided into five sub-regions using an image template 204. A histogram is generated for each image portion falling within the five sub-regions 206.

Figure 3:
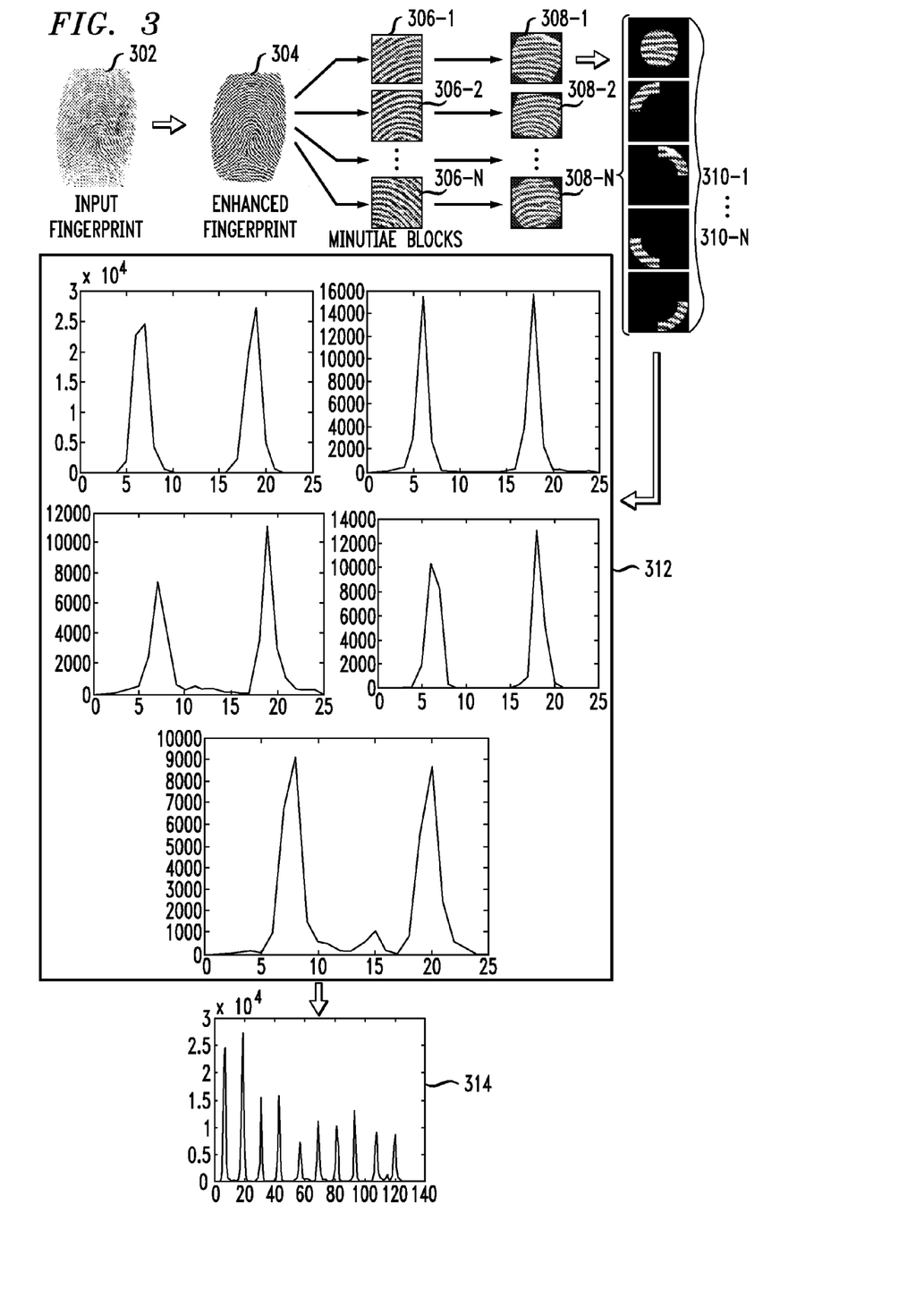
FIG. 3 is a diagram illustrating the methodology of FIG. 1 as applied to a given example, according to an embodiment of the present invention.

Referring now to FIG. 3, a diagram illustrates the methodology of FIG. 1 as applied to a given example, according to an embodiment of the present invention. FIG. 3 shows a schematic of one proposed approach. First, a fingerprint image 302 is input. The fingerprint image may be scanned or may be an existing fingerprint image stored in a biometric database. In an illustrative embodiment, the fingerprint image is enhanced 304 for better image resolution. Enhancing a fingerprint image increases the resolution of ridge flow patterns, which results in more accurate gradient characterizations. Techniques to enhance an image are known to a person having ordinary skill in the art. Enhancement may be carried out by designing suitable filters using a particular frequency domain or spatial domain. The filters may be tuned to a specific range of fingerprint ridge characteristics and/or noise models. Also, methods to create filters using expert marked fingerprint ridges have also been reported.

Minutiae (e.g., fingerprint feature points) of the fingerprint image are then detected using any conventional technique. For each minutiae feature, a suitable-sized neighborhood block (e.g., region or patch) is obtained (306-1, ... 306-N). In an exemplary embodiment, each patch is rotated based on a general minutiae orientation to negate the effect of global rotation on HOG computation. The rotation may be a vertical alignment or a horizontal alignment. Each of the rotated patches (308-1, ... 308-N) are then divided into five sub-regions (310-1, ... 310-N). HOG descriptors are then computed for each sub-region creating a collection of HOG descriptors (312) unique to a given patch (308-1, . . . 308-N).

In an illustrative embodiment, the HOG computation involves spatial smoothing followed by a gradient computation. Each HOG is the weighted histogram of the gradient orientations where weights are given by the gradient magnitudes. The gradient value at every pixel in a sub-region may be calculated using many well known gradient operators including: Roberts Cross, Sobel, and Prewitt. Other discrete differentiation schemes to compute the gradient, $G_x$ and $G_y$ (gradients in the x and y directions) may also be constructed. Once the $G_x$ and $G_y$ are computed, the gradient orientation is computed using $\Theta = \arctan(G_x/G_y)$. For the purpose of computing the histogram, $\Theta$ is quantized to a desired number of bins.

The HOGs of the sub-regions are then combined into a concatenated HOG, or histogram 314. The concatenation process simply involves connecting the HOGs of the sub-regions, one after the other in a consistent manner. In an exemplary embodiment, a HOG is presented in graphical form and a concatenated HOG is a combined graph comprising the HOGs of a patch. If a patch is divided into five sub-regions labeled MIDDLE, TOP_LEFT, TOP_RIGHT, BOTTOM_LEFT, and BOTTOM_RIGHT, one concatenation may be, from left to right, MIDDLE—TOP_LEFT—TOP_RIGHT—BOTTOM_LEFT—BOTTOM_RIGHT. For matching purposes, every concatenated histogram should be concatenated in the same order or else two concatenated histograms which should have matched will not match. For instance, the gradient characterization of MIDDLE—TOP_LEFT—TOP_RIGHT—BOTTOM_LEFT—BOTTOM_RIGHT, will look different than TOP_LEFT—TOP_RIGHT—MIDDLE—BOTTOM_LEFT—BOTTOM_RIGHT.

For the above example, it should be noted that each concatenated HOG comprises five HOGs (one for each sub-region). The concatenated HOG will be the textural description of a patch of a corresponding minutiae point. In an exemplary embodiment, the generation of a concatenated HOG is repeated for each selected fingerprint feature point (e.g., minutiae point). In the end, the inputted fingerprint image will be represented as one set of concatenated HOGs, one concatenated HOG 314 for each selected minutiae (306-1, . . . 306-N).

Figure 4:
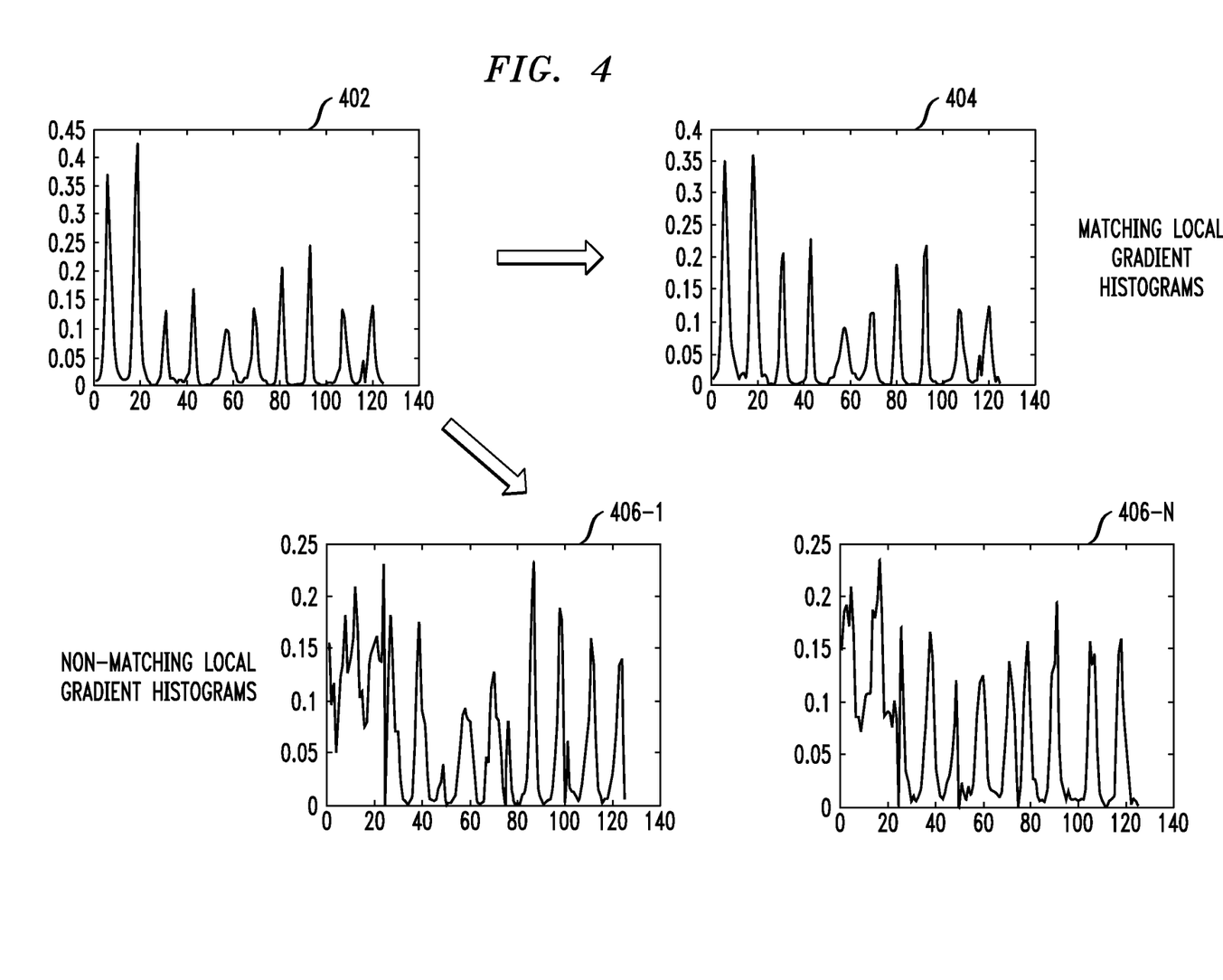
FIG. 4 is a diagram illustrating a comparison of a concatenated gradient histogram to matching and non-matching gradient histograms, according to an embodiment of the present invention.

Referring now to FIG. 4, a diagram illustrates a comparison of a concatenated gradient histogram to matching and non-matching gradient histograms, according to an embodiment of the present invention. Given two fingerprints to match, one can easily compare the concatenated HOG features as follows. In an exemplary embodiment, the matching algorithm is based on counting the number of correspondences between the HOG features of two fingerprints. Two HOG features are corresponding if they are maximally correlated with each other in both directions. The details of this algorithm are as follows. Suppose $M_1$ and $M_2$ denote the set of HOG features for two fingerprints with $m_1$ and $m_2$ histograms, respectively. A histogram $m_1^i \in M_1$ corresponds to a histogram $m_2^j$ if and only if:

$$\{m_1^i \cdot m_2^j > m_1^i \cdot m_2^k | \forall m_2^k \in M_2, k \neq j\}, \text{ and}$$

$$\{m_1^i \cdot m_2^j > m_1^l \cdot m_2^j | \forall m_1^l \in M_1, l \neq i\}$$

In an alternative embodiment, a threshold may be applied to the value $m_1^i \cdot m_2^j$ to avoid any chance correspondence. The total number of correspondences obtained this way is normalized by the total number of minutiae in the two fingerprints and is used as the similarity score for matching tasks. FIG. 4 shows an example comparison of a given concatenated HOG 402 to matching HOG (404) and non-matching HOGs (406-1, . . . 406-N). Further, since the HOG features are computed around minutiae locations, one can use the proposed HOG-based characterizations to verify the quality of minutiae matches across two fingerprints.

Figure 5:
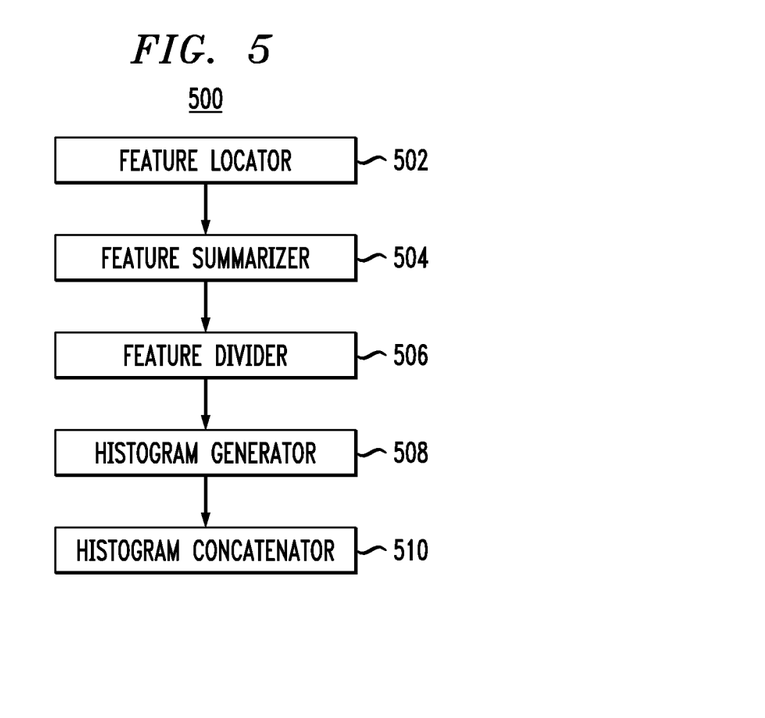
FIG. 5 is a flow diagram illustrating a system for generating a gradient characterization for a fingerprint image, according to an embodiment of the present invention.

Referring now to FIG. 5, a flow diagram illustrates a system for generating a gradient characterization for a fingerprint image, according to an embodiment of the present invention. The components of system 500 carry out the methods illustrated in FIG. 1. System 500 begins at feature locator 502. The feature locator carries out step 102 of FIG. 1, in which fingerprint feature points are selected from a fingerprint image. Next, the feature summarizer 504 carries out step 104 of FIG. 1. The feature summarizer obtains a region representing an area proximate each selected fingerprint feature point.

After summarizing the feature points, feature divider 506 carries out step 106 of FIG. 1. In an illustrative embodiment, the feature divider divides each obtained region into a plurality of sub-regions. The histogram generator 508, which carries out step 108 of FIG. 1, then generates a histogram for each of the plurality of sub-regions. The histograms are then combined into a concatenated histogram by the histogram concatenator 510. The histogram concatenator 510 carries out step 110 of FIG. 1. The concatenated histograms are then used for identification purposes.

Figure 6:
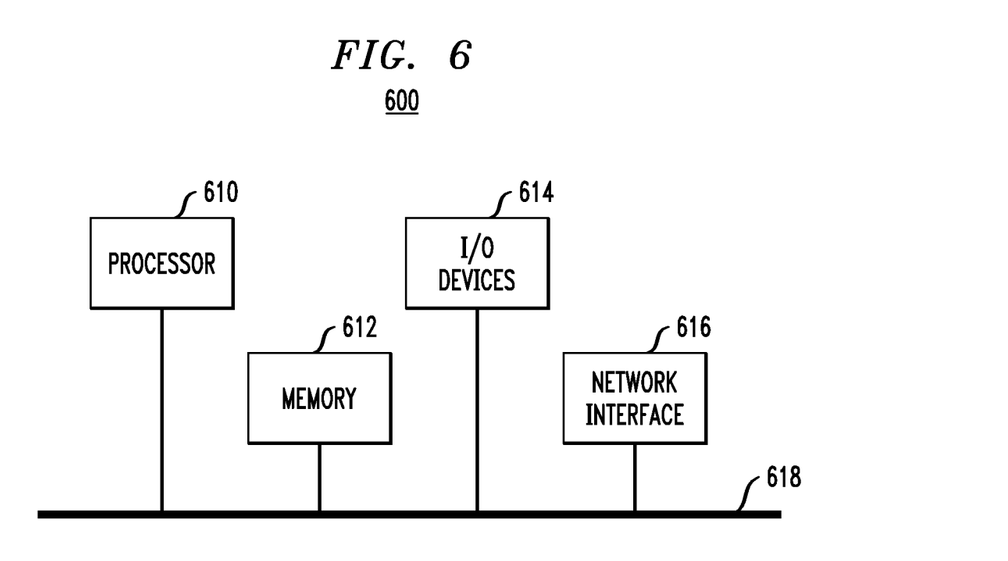
FIG. 6 is a diagram illustrating an illustrative hardware implementation of a computing system in accordance with which one or more components/methodologies of the present invention may be implemented, according to an embodiment of the present invention.

Referring now to FIG. 6, block diagram 600 illustrates an exemplary hardware implementation of a computing system in accordance with which one or more components/methodologies of the invention (e.g., components/methodologies described in the context of FIGS. 1-5) may be implemented, according to an embodiment of the present invention.

As shown, the techniques for generating a gradient characterization for a fingerprint image may be implemented in accordance with a processor 610, a memory 612, I/O devices 614, and a network interface 616, coupled via a computer bus 618 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for generating a gradient characterization for a first fingerprint image of an individual, the method comprising:
    selecting one or more fingerprint feature points from the first fingerprint image, wherein selecting a feature point includes selecting a fingerprint feature that is unique to the individual;
    obtaining a region for each of the one or more selected fingerprint feature points, wherein each obtained region is a representation of an area proximate a given selected fingerprint feature point;
    dividing each of the obtained regions into a plurality of sub-regions;
    for each obtained region, generating a gradient histogram for each of the plurality of sub-regions associated with the obtained region; and
    combining the generated gradient histograms for the plurality of sub-regions of a given region into a concatenated gradient histogram representative of the given region, wherein the concatenated gradient histogram is used for identification purposes.

2. The method of claim 1, wherein the gradient histogram is a histogram of oriented gradient.

3. The method of claim 1, further comprising the step of enhancing the first fingerprint image before selecting the one or more fingerprint feature points.

4. The method of claim 1, further comprising the step of rotating each obtained region into a comparable direction.

5. The method of claim 1, further comprising the step of generating a first histogram set comprising the concatenated histograms of the first fingerprint image.

6. The method of claim 5, further comprising the step of generating one or more second histogram sets using one or more second fingerprint images.

7. The method of claim 6, further comprising the step of comparing the first histogram set to the one or more second histogram sets.

8. The method of claim 7, wherein the step of comparing further comprises the step of computing a degree of correlation between the first histogram set and the one or more second histogram sets.

9. The method of claim 8, wherein the degree of correlation is based on a number of correspondences between the first histogram set and the one or more second histogram sets.

10. An article of manufacture for generating a gradient characterization for a first fingerprint image, wherein the article of manufacture comprises a physical computer readable storage medium storing one or more programs, which when executed by a computer implement the steps of claim 1.

11. An apparatus for generating a gradient characterization for a first fingerprint image of an individual, the apparatus comprising:
    a memory; and
    at least one processor coupled to the memory and operative to:
    select one or more fingerprint feature points from the first fingerprint image, wherein selecting a feature point includes selecting a fingerprint feature that is unique to the individual;
    obtain a region for each of the one or more selected fingerprint feature points, wherein each obtained region is a representation of an area proximate a given selected fingerprint feature point;
    divide each of the obtained regions into a plurality of sub-regions;
    for each obtained region, generate a gradient histogram for each of the plurality of sub-regions associated with the obtained region; and
    combine the generated gradient histograms for the plurality of sub-regions of a given region into a concatenated gradient histogram representative of the given region, wherein the concatenated gradient histogram is used for identification purposes.

12. The apparatus of claim 11, wherein the gradient histogram is a histogram of oriented gradient.

13. The apparatus of claim 11, wherein the at least one processor is further operative to enhance the first fingerprint image before selecting the one or more fingerprint feature points.

14. The apparatus of claim 11, wherein the at least one processor is further operative to rotate each obtained region into a comparable direction.

15. The apparatus of claim 11, wherein the at least one processor is further operative to generate a first histogram set comprising the concatenated histograms of the first fingerprint image.

16. The apparatus of claim 15, wherein the at least one processor is further operative to generate one or more second histogram sets using one or more second fingerprint images.

17. The apparatus of claim 16, wherein the at least one processor is further operative to compare the first histogram set to the one or more second histogram sets.

18. The apparatus of claim 17, wherein the at least one processor is further operative to compute a degree of correlation between the first histogram set and the one or more second histogram sets.

19. The apparatus of claim 18, wherein the degree of correlation is based on a number of correspondences between the first histogram set and the one or more second histogram sets.

20. A system comprising:
    a memory for storing program instructions for a biometric identification system, the program instructions being executable by a computer processing system to implement:
    a feature locator for selecting one or more fingerprint feature points from the first fingerprint image of an individual, wherein selecting a feature point includes selecting a fingerprint feature that is unique to the individual;
    a feature summarizer for obtaining a region for each of the one or more selected fingerprint feature points, wherein each obtained region is a representation of an area proximate a given selected fingerprint feature point;
    a feature divider for dividing each of the obtained regions into a plurality of sub-regions;
    a histogram generator for generating, for each obtained region, a gradient histogram for each of the plurality of sub-regions associated with the obtained region; and
    a histogram concatenator for combining the generated gradient histograms for the plurality of sub-regions of is given region into a concatenated gradient histogram representative of the given region, wherein the concatenated gradient histogram is used for identification purposes.

* * * * *